US011483183B1

(12) United States Patent
Moinuddin et al.

(10) Patent No.: US 11,483,183 B1
(45) Date of Patent: Oct. 25, 2022

(54) BLIND METHOD OF EQUALIZING SIGNALS IN FILTER BANK MULTI-CARRIER COMMUNICATIONS

(71) Applicant: King Abdulaziz University, Jeddah (SA)

(72) Inventors: Muhammad Moinuddin, Jeddah (SA); Ubaid M. Al-Saggaf, Jeddah (SA); Jawwad Ahmad, Karachi (PK); Asmaa Ubaid Al-Saggaf, Jeddah (SA); Mohammad S. Alhazmi, Makkah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/497,184

(22) Filed: Oct. 8, 2021

(51) Int. Cl.
*H04L 25/03* (2006.01)
*H04L 27/26* (2006.01)
*H04L 25/02* (2006.01)

(52) U.S. Cl.
CPC ...... *H04L 25/0305* (2013.01); *H04L 25/0238* (2013.01); *H04L 27/2676* (2013.01)

(58) Field of Classification Search
CPC ........... H04L 27/26416; H04L 27/2654; H04L 27/3411; H04L 27/362; H04L 27/38; H04L 25/08; H04L 27/2614; H04L 27/2636; H04L 27/264
See application file for complete search history.

(56) References Cited

U.S. PATENT DOCUMENTS

| 2006/0280257 A1* | 12/2006 | Kim ................. H04L 25/03159 375/267 |
| 2014/0192925 A1* | 7/2014 | Li ....................... H04L 27/3411 375/297 |
| 2017/0170950 A1 | 6/2017 | Kim et al. |
| 2018/0019905 A1 | 1/2018 | Zhu et al. |
| 2019/0036745 A1 | 1/2019 | Dzung |

OTHER PUBLICATIONS

Ihalainen, et al.; Channel Equalization for Multi-Antenna FBMC/OQAM Receivers; IEEE Transactions on Vehicular Technology, vol. 60, No. 5; Jun. 2011; 16 Pages.

* cited by examiner

*Primary Examiner* — Mansour Oveissi
*Assistant Examiner* — David M Oveissi
(74) *Attorney, Agent, or Firm* — Oblon, McClelland, Maier & Neustadt, L.L.P.

(57) ABSTRACT

A device, method, and non-transitory computer readable medium to perform a method of blind equalization implemented by a filter bank multi-carrier with offset quadrature amplitude modulation (FBMC-OQAM) transmission system. A first matrix W is obtained by dividing a second matrix V by a receiver waveform matrix G. The second matrix V is obtained by calculating a total objective function J until the total objective function J is either constant or below a threshold error margin. The calculation of the total objective function J includes iterating calculations with a plurality of combination of a frequency bin p and a time slot q. Weights of the obtained first matrix W are applied to an equalizer. A received signal in the equalizer is processed using the applied weights. The weights of the obtained first matrix W are configured to minimize a total outage probability $P_{out,\ TOTAL}$.

19 Claims, 10 Drawing Sheets

BLIND METHOD OF EQUALIZING SIGNALS IN FILTER BANK MULTI-CARRIER COMMUNICATIONS

STATEMENT OF ACKNOWLEDGEMENT

The inventors extend their appreciation to the Deputyship for Research and Innovation, Ministry of Education in Saudi Arabia for funding this research work through the project number 2020-049 and King Abdulaziz University, DSR, Jeddah, Saudi Arabia.

BACKGROUND

Technical Field

The present disclosure is directed to blind method of equalization in Filter Bank Multi-Carrier with Offset Quadrature Amplitude Modulation (FBMC-OQAM) system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

High data-rate is desirable in many wireless multimedia applications. Traditional single carrier modulation techniques can achieve only limited data rates due to restrictions imposed by multipath effect of wireless channel and receiver complexity. In single carrier systems, as the data-rate in communication system increases, the symbol duration gets reduced. Therefore, the communication systems using single carrier modulation suffer from severe inter-symbol interference (ISI) caused by dispersive-channel impulse response, and thus require a complex equalization scheme.

Orthogonal Frequency Division Multiplexing (OFDM) is a digital multi-carrier modulation technique that extends the concept of single carrier modulation techniques by using multiple subcarriers. Rather than transmitting a high-rate stream of data with a single carrier, the OFDM uses a large number of closely spaced orthogonal subcarriers, each carrying low bit rate data, that are transmitted in parallel. The combination of many subcarriers, each carrying low bit rate data, enables high data rate, and makes it resilient to selective fading, interference, and multipath effects.

The choice of a modulation technique to be used for the fifth-generation (5G) mobile communications has been topic of much discussion in both the research community and the mobile communication industry. Finally, the 3rd Generation Partnership Project (3GPP) decided to use the OFDM with few modifications for the 5G mobile communications. Although, OFDM provides compatibility to the fourth generation (4G) communication systems, one of the major disadvantages of OFDM is its poor spectral properties. Thus, other modulation techniques with improved spectral properties are required to be explored.

In this context, various multi-carrier modulation techniques have been proposed for 5G communications. For example, windowed OFDM (also called OFDM with Weighted Over Lap and Add (WOLA)) is one of the modulation schemes. Cyclic Prefixed OFDM (CP-OFDM) is another modulation scheme. However, the CP-OFDM waveform meets the complex orthogonality property, but suffers from poor localization in frequency domain due to Sinc-shaped spectrum of the pulse. Moreover, the CP-OFDM does not achieve maximum spectral efficiency due to additional overhead of the CP-OFDM. Another modulation scheme is Universal Filtered Multi-Carrier (UFMC) which applies sub band wise filtering based on a Dolph-Chebyshev window. Filtered-OFDM (f-OFDM) is another modulation scheme where the number of subcarriers for one sub band is usually much higher than in UFMC. Recently, there has been more focus on Filter Bank Multi-Carrier (FBMC) modulation scheme which offers much better spectral properties. There are different types of FBMC, however, the most popular one is FBMC with Offset Quadrature Amplitude Modulation (OQAM). Staggered multitoned and cosine-modulated multi-tone are other variants of the FBMC.

The FBMC-OQAM has lower out-of-band (OOB) emissions than that of the OFDM and complex orthogonality of signal waveforms is replaced by real orthogonality. Due to the pulse shaping design of FBMC-OQAM modulation schemes, they can be better localized in time and frequency. With this flexibility, FBMC-OQAM achieves higher spectral efficiency. However, due to loss of complex orthogonality, the FBMC-OQAM inherits intrinsic imaginary interference which requires special dealing in designing channel estimation and equalization techniques. Channel estimation can be considered for Single-Input and Single-Output (SISO) FBMC system and for Multiple-Input and Multiple-Output (MIMO) FBMC system.

Communication channel is one of the primary reasons for signal distortion in any communication system. Therefore, it is vital to design efficient channel estimation and equalization techniques to attain high reliability performance in the communication systems. However, the channel estimation task in FBMC systems is very critical compared to the OFDM systems due to the presence of intrinsic imaginary interference.

In flat fading channels, the effect of inter-symbol interference (ISI) from the channel is almost negligible and hence simple one-tap equalizer is sufficient. However, in frequency selective channels, the effect of ISI is dominant and one-tap equalizers fail to perform good especially at high SNR values. Thus, it is necessary to design sophisticated and efficient equalization methods for recovering the transmitted signal.

It is common practice to assume a time-invariant channel in dealing with the equalization task in FBMC. A parallel equalization scheme that requires multiple parallel Fast Fourier Transform (FFT) blocks has been proposed. Another method which is also based on FFT has been proposed, but it requires a larger FFT size to process equalization. An equalization scheme based on Minimum Mean Squared Error (MMSE) criterion has been proposed for a time-invariant channel and was later modified to the MIMO scenario. A generalized structure for n-tap MMSE equalizer has been proposed for the FBMC systems, which includes the effect of neighboring time-frequency symbols into the calculation. This equalization method operates after the conventional FFT step at the receiver. One of the important features of the n-tap MMSE equalizer is that it incorporates the effect of neighboring time-symbols in addition to neighboring subcarriers. Also, a low-complexity interference cancellation method has been proposed for the FBMC.

Further, a frequency domain equalizer for the FBMC system has been proposed where channel estimation is utilized to perform layered detection, which showed improved BER performance of the FBMC system. However, this method is based on a supervised learning method.

An improved sphere decoding based equalization algorithm for the FBMC system has been proposed. This method not only improves the BER performance but also reduces the computational complexity of the system.

Further, an equalizer has been proposed that processes each subcarrier signal by parallel filtering, whose weights are computed using a successive time-domain derivative of an original prototype filter in each corresponding filter bank. Moreover, the proposed equalizer requires inverse of the channel frequency response of the channel at each sub-carrier. Thus, it requires the knowledge of channel frequency response at each sub-carrier frequency.

Additionally, a method for receiving a signal modulated using a Cosine Modulated Filter Bank CMFB and carrying digital data using matrix equalizer to reduce signal distortion introduced by the transmission channel was described in US20190036745A1, "Matrix Equalizer for CMFB Transmission in Dispersive Channels", incorporated herein by reference in its entirety. However, this reference does not disclose maximizing statistical Signal-to-Interference-and-Noise Ratio (SINR) to minimize outage probability.

A method and apparatus for multi-user reception in a wireless communication system that receives signals from multiple transmitting ends, separately configures filters for each of the multiple transmitting ends, and filters the signals using each of the separately configured filters was described in US20170170950A1, "Method and Apparatus for Multi-User Reception in Wireless Communication System", incorporated herein by reference in its entirety. However, this reference does not disclose maximizing statistical SINR to minimize outage probability.

A method for interference cancellation to reduce the impact of inherent interference in filter bank multi-carrier/offset quadrature amplitude modulation (FBMC/OQAM) system on system performances, and increase spectral efficiency and design flexibility of the FBMC/OQAM system was described in US20180019905A1, "Method and Auxiliary Method, Apparatus, Base Station and User Equipment for Interference Cancellation", incorporated herein by reference in its entirety. However, this reference does not disclose maximizing statistical SINR to minimize outage probability.

Further, the problem of channel equalization in filter bank multicarrier (FBMC) transmission based on the offset quadrature-amplitude modulation (OQAM) subcarrier modulation is described in a reference. The reference discloses that Finite impulse response (FIR) per-subchannel equalizers are derived based on the frequency sampling (FS) approach, both for the single-input multiple-output (SIMO) receive diversity and the multiple-input multiple-output (MIMO) spatially multiplexed FBMC/OQAM systems. (See: Tero Ihalainen; Aïssa Ikhlef; Jérôme Louveaux; Markku Renfors, "Channel equalization for multi-antenna FBMC/OQAM receivers", IEEE Transactions on Vehicular Technology (Volume: 60, Issue: 5, June 2011), DOI: 10.1109/TVT.2011.2145424, incorporated herein by reference in its entirety). However, this reference does not disclose maximizing statistical SINR to minimize outage probability.

Each of the aforementioned references suffers from one or more drawbacks hindering their adoption. Accordingly, it is one object of the present disclosure to provide methods and systems for equalizing signals in FBMC communications.

SUMMARY

In an exemplary embodiment, a filter bank multi-carrier with offset quadrature amplitude modulation (FBMC-OQAM) transmission system that performs blind equalization is disclosed. The FBMC-OQAM transmission system includes processing circuitry configured to obtain a first matrix W by dividing a second matrix V by a receiver waveform matrix G. The second matrix V is obtained by calculating a total objective function J until the total objective function J reaches a threshold value. The calculation of the total objective function J includes iterating calculations with a plurality of combination of a frequency bin p and a time slot q. The processing circuitry is further configured to apply weights of the obtained first matrix W to an equalizer and process a received signal in the equalizer using the applied weights. The weights of the obtained first matrix W are configured to minimize a total outage probability $P_{out, TOTAL}$.

In another exemplary embodiment, a method of blind equalization implemented by a filter bank multi-carrier with offset quadrature amplitude modulation (FBMC-OQAM) transmission system is disclosed. The method includes obtaining a first matrix W by dividing a second matrix V by a receiver waveform matrix G. The second matrix V is obtained by calculating a total objective function J until the total objective function J reaches a threshold value. The calculation of the total objective function J includes iterating calculations with a plurality of combination of a frequency bin p and a time slot q. The method further includes applying weights of the obtained first matrix W to an equalizer. The method further includes processing a received signal in the equalizer using the applied weights. The weights of the obtained first matrix W are configured to minimize a total outage probability $P_{out, TOTAL}$.

In another exemplary embodiment, a non-transitory computer readable medium having instructions stored therein that, when executed by one or more processors, cause the one or more processors to perform a method of blind equalization implemented by a filter bank multi-carrier with offset quadrature amplitude modulation (FBMC-OQAM) transmission system. The method includes obtaining a first matrix W by dividing a second matrix V by a receiver waveform matrix G. The second matrix V is obtained by calculating a total objective function J until the total objective function J reaches a threshold value. The calculation of the total objective function J includes iterating calculations with a plurality of combination of a frequency bin p and a time slot q. The method further includes applying weights of the obtained first matrix W to an equalizer and processing a received signal in the equalizer using the applied weights. The weights of the obtained first matrix W are configured to minimize a total outage probability $P_{out, TOTAL}$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
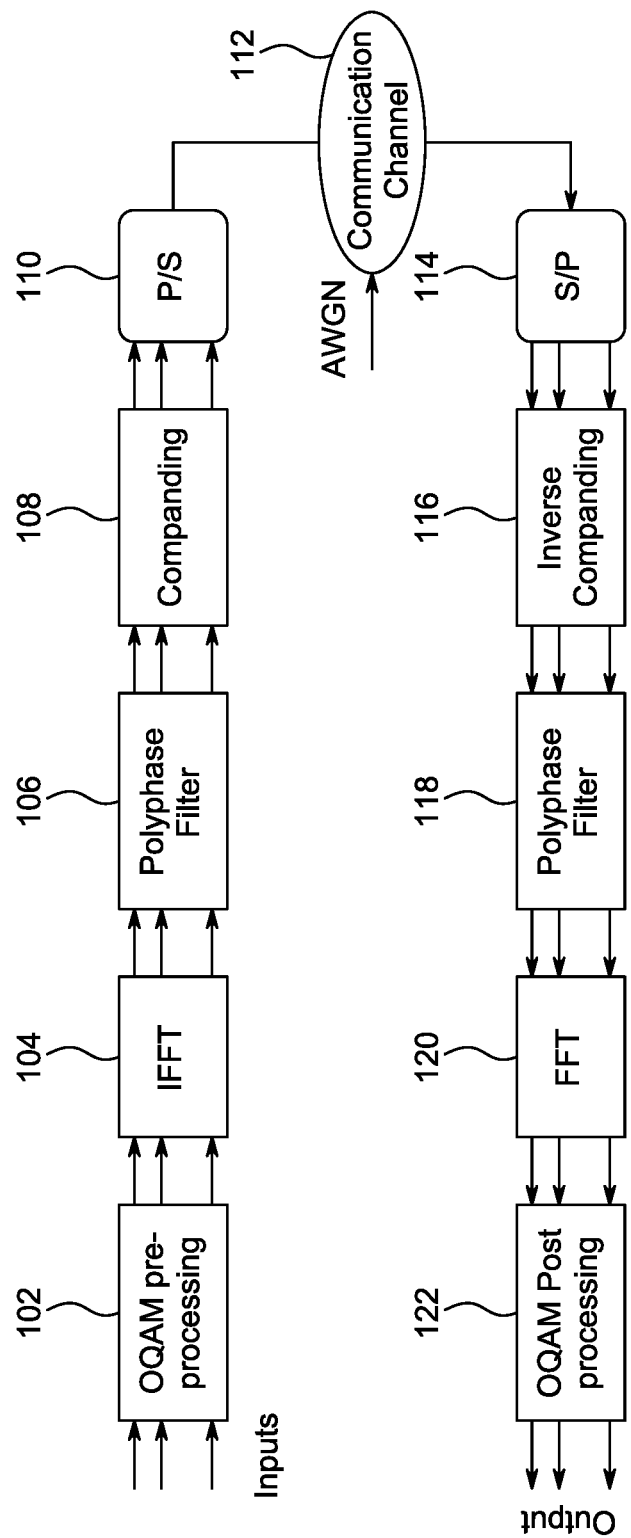
FIG. 1 is a block diagram of transmission system for FBMC-OQAM, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for blind equalization implemented by a filter bank multi-carrier with offset quadrature amplitude modulation (FBMC-OQAM) transmission system (also generally referred to as FBMC-OQAM system). The blind equalization method for the FBMC-OQAM system is based on statistical information of communication channel, i.e., that is, correlation matrix knowledge of the communication channel. According to the aspects of the present disclosure, statistical SINR of the communication channel is maximized to obtain equalizer weights. The blind equalization method is based on minimizing outage probability of the FBMC-OQAM system using maximization of the statistical SINR.

FIG. 1 depicts a block diagram of an FBMC-OQAM system 100, according to exemplary aspects of the present disclosure. The FBMC-OQAM system 100 comprises a OQAM pre-processing block 102, an Inverse Fast Fourier Transform (IFFT) block 104, a poly-phase filter block 106, a companding block 108, a parallel to serial (P/S) converter block 110, a communication channel 112, a serial to parallel (S/P) converter block 114, an inverse companding block 116, a poly-phase filter block 118, a Fast Fourier Transform (FFT) block 120, and a OQAM post-processing block 122. The pre-processing block 102, the IFFT block 104, the poly-phase filter block 106, the companding block 108, and the P/S converter block 110 collectively forms the transmitter side of the FBMC-OQAM system 100. The S/P converter block 114, the inverse companding block 116, the poly-phase filter block 118, the FFT block 120, and the OQAM post-processing block 122 collectively forms the receiver side of the FBMC-OQAM system 100.

The FBMC-OQAM system 100 has most of the characteristics of symbol density as that of Orthogonal Frequency Division Multiplexing (OFDM) without cyclic prefix. The complex orthogonality condition $\langle g l1,k1(t), gl2,k2(t)\rangle = \delta(l2-l1),(k2-k1)$ of OFDM is substituted by the less strict real orthogonality condition $R\{\langle gl1,k1(t), gl2,k2(t)\rangle\}=\delta(l2-l1),(k2-k1)$ in FBMC-OQAM system 100.

A transmitted basis pulse for $l^{th}$ frequency and $k^{th}$ time symbol denoted by $g_l(t)$ can be defined as:

$$g_{l,k}(t) = p(t - kT)e^{\frac{j2\pi}{F(t-kT)}}e^{j\theta_{l,k}} \qquad (1)$$

Assuming $g_l$, represents sampled version of the basis pulse $g_{l,k}(t)$, then $g_{l,k}$ is used to denote N samples basis pulse vector for $l_{th}$ frequency and $k_{th}$ time symbol. Considering that there are total L frequency sub-carriers and K time symbols. By stacking all the basis pulse vectors in a large transmit matrix $G \in C^{N \times LK}$ as:

$$G=[g_{1,1} \cdots g_{L,1} \; g_{1,2} \cdots g_{L,K}] \qquad (2)$$

and all data symbols in a large transmit symbol vector x $\in C^{LK \times 1}$ as:

$$x=[x_{1,1} \cdots x_{1,k} \; x_{L,1} \ldots \ldots x_{L,K}]^T \qquad (3)$$

the sampled transmit signal $s \in C^{N \times 1}$ is expressed as $$s=Gx \qquad (4)$$

Multipath propagation over time-variant channels is modeled by a time-variant impulse response denoted as $h[m_\tau, n]$, where $m_\tau$ represents the delay and n the time position. By writing the impulse response in a time-variant convolution matrix $H \in C^{N \times N}$, defined as, $$[H]_{i,j}=h[i-j,i] \qquad (5)$$

the received signal can be expressed as:

$$r=HGx+\tilde{n} \qquad (6)$$

where $\tilde{n}$, is a zero mean complex white Gaussian noise vector with correlation matrix $P_n I$ where $P_n$ is noise power. Because of linearity, matrix G can be found even though underlying modulation format is not known in detail. Similarly, sampled receive basis pulses $q_{l,k} \in C^{N \times 1}$ can also be stacked in a matrix as:

$$Q=[q_{1,1} \cdots q_{1,K} \; q_{L,1} \cdots q_{L,K}] \qquad (7)$$

For Filter Bank Multi-Carrier (FBMC) system, the receiver uses matched filter, i.e., Q=G. Thus, the received symbols in (6) after pulse de-shaping by Q=G can be written as:

$$y=G^H r=G^H HGx+n \qquad (8)$$

where $n \sim CN(0, P_n GHG)$.

According to aspects of the present disclosure, the method of blind equalization implemented by the FBMC-OQAM system 100 processes the received symbols y to obtain an estimate of the transmitted symbols.

In conventional techniques of equalization in the FBMC system, the channel induced interference is assumed to be abandoned compared to the noise. Thus, the off-diagonal elements of $G^H HG$ are so minor that they are dominated by noise. Therefore, only the diagonal elements of $G^H HG$ remain and allow to examine the channel according to:

$$y \approx \text{diag}\{h_1\}G^H Gx+n \qquad (8')$$

where $h_1 \in \mathbb{C}^{LK \times 1}$ describes the one-tap channel. The operator diag{·} creates a diagonal matrix out of a vector. Thus, the conventional one-tap equalizer utilizes knowledge of the communication channel 112 to find the estimate of the transmitted symbols as follows:

$$\hat{x}(i) = Qc\left(\text{Re}\left\{\frac{y(i)}{h_1(i)}\right\}\right) \qquad (9)$$

where Re{ } represents the real part and Qc(.) is the hard decision operator. Phase equalization of equation (8) in conventional methods is followed by taking the real part, which cancels the imaginary interference in the FBMC-OQAM system 100. Removing the imaginary interference does not remove any important information in an additive white Gaussian noise (AWGN) channel. However, this is not true in fading channels. Thus, the imaginary interference due to loss of the complex orthogonality in the FBMC-OQAM system 100 has a severe effect in fading channels, specifically in selective channels. Also, impact of the off-diagonal elements of $G^H H G$ cannot be ignored as these contribute to interference from other frequency-time symbols. Thus, equalizer design for the FBMC-OQAM system 100 requires dealing with the off-diagonal elements also. Hence, performance of the conventional one-tap channel equalizer and the minimum mean-squared error (MMSE) equalizer is degraded and fails to provide satisfactory results.

According to aspects of the present disclosure, an expression for outage probability for a specific frequency bin (p) and time slot (q) is derived in the presence of an arbitrary equalizer weight matrix denoted by W The equalizer matrix W is multiplied by receiver waveform matrix G The combined receiver matrix is denoted by V defined as:

$$V = GW \qquad (10)$$

As a result, the received processed signal is given by:

$$y = V^H H G x + V^H n \qquad (11)$$

Here, the LK × 1 vector y contains the processed symbols for all time slots and frequency bins. Thus, the $pq^{th}$ processed symbol takes the following shape:

$$y_{pq} = v_{pq}^H H g_{pq} + v_{pq}^H H \sum_{\substack{l'=1 \\ l' \neq p}}^{L} \sum_{K'=1}^{K} g_{l'K'} x_{l'K'} + v_{pq}^H H \sum_{\substack{K'=1 \\ K' \neq q}}^{K} g_{pK'} x_{lK'} + v_{pq}^H n \qquad (12)$$

Further, the energies of all the terms appearing in equation (12) is evaluated. Considering the energies of the transmitted signal to be unity, i.e., $E|x_{lk}|^2 = 1$, for all l and k, instantaneous SINR for the $pq^{th}$ processed symbol is given by:

$$SINR_{pq} = \frac{|v_{pq}^H H g_{pq}|^2}{|v_{pq}^H H g_\alpha|^2 + |v_{pq}^H H g_\beta|^2 + \sigma_n^2 Tr(v_{pq} v_{pq}^H)} \qquad (13)$$

where Tr(.) represents the trace operator and the terms $g_\alpha$ and $g_\beta$ represent:

$$g_\alpha = \sum_{\substack{l'=1 \\ l' \neq p}}^{L} \sum_{K'=1}^{K} g_{l'K'} \qquad (14)$$

$$g_\beta = \sum_{\substack{K'=1 \\ K' \neq q}}^{K} g_{pK'} \qquad (15)$$

Further, using the whitening transformation for the channel matrix via $H = R_{R_X}^{1/2} \bar{H} R_{T_X}^{1/2}$ and using the following definitions:

$$\left.\begin{array}{l} v_{pq_R} = R_{R_X}^{\frac{1}{2}} v_{pq} \\ g_{pq_T} = R_{T_X}^{\frac{1}{2}} g_{pq} \\ g_{\alpha_T} = R_{T_X}^{\frac{1}{2}} g_\alpha \\ g_{\beta_T} = R_{T_X}^{\frac{1}{2}} g_\beta \end{array}\right] \qquad (16)$$

the SINR expression in equation (13) is reformulated as:

$$SINR_{pq} = \frac{\|\bar{h}\|_{A_1}^2}{\|\bar{h}\|_{A_2}^2 + \sigma_n^2 Tr(v_{pq} v_{pq}^H)} \qquad (17)$$

where $\bar{h} = \text{vec}(\bar{H})$ is the vector version of channel matrix and the matrices A1 and A2 are given by:

$$A_1 = (v_{pq_R} \otimes g_{pq_T})^H (v_{pq_R} \otimes g_{pq_T}) \qquad (18)$$

$$A_2 = (v_{pq_R} \otimes g_{\alpha_T})^H (v_{pq_R} \otimes g_{\alpha_T}) + (v_{pq_R} \otimes g_{\beta_T})^H (v_{pq_R} \otimes g_{\beta_T}) \qquad (19)$$

The outage probability of the $pq^{th}$ processed symbol can now be evaluated as:

$$P_{out_{p,q}}(\gamma_{th}) = P(SINR_{pq} \leq \gamma_{th}) \qquad (20)$$

which is equivalent to write as:

$$P_{out_{p,q}}(\gamma_{th}) = P\left(\frac{\|\bar{h}\|_{A_1}^2}{\|\bar{h}\|_{A_2}^2 + \sigma_n^2 Tr(v_{pq} v_{pq}^H)} \leq \gamma_{th}\right) \qquad (21)$$

The above outage probability when evaluated using indefinite quadratic forms approach results in the following expression:

$$P_{out_{p,q}}(\gamma_{th}) = \qquad (22)$$

$$u(\gamma_{th} \sigma_n^2 Tr(v_{pq} v_{pq}^H)) - \sum_{t=1}^{T} \left( \frac{\lambda_t^T e^{-\frac{\gamma_{th} \sigma_n^2 Tr(v_{pq} v_{pq}^H)}{\lambda_t}}}{\prod_{\substack{i=1 \\ i \neq t}}^{T} (\lambda_t - \lambda_i) |\lambda_t|} u\left(\frac{\gamma_{th} \sigma_n^2 Tr(v_{pq} v_{pq}^H)}{\lambda_t}\right) \right)$$

where $\lambda_t$ is the $t^{th}$ eigenvalue of the matrix $A_1 - \gamma_{th} A_2$. Now, the total outage probability for a time-frequency batch of LK symbols is computed as follows:

$$P_{out,TOTAL} = \frac{1}{LK} \sum_{p=0}^{L-1} \sum_{q=0}^{K-1} P_{out,pq} = \frac{1}{LK} \sum_{p=0}^{L-1} \sum_{q=0}^{K-1} \left[ u(\gamma_{th} \sigma_n^2 Tr(v_{pq} v_{pq}^H)) - \right. \qquad (23)$$

$$\sum_{t=1}^{T}\left(\frac{\lambda_t^T e^{-\frac{\gamma_{th}\sigma_n^2 Tr(v_{pq}v_{pq}^H)}{\lambda_t}}}{\prod_{\substack{i=1\\i\neq t}}^{T}(\lambda_t-\lambda_i)|\lambda_t|}u\left(\frac{\gamma_{th}\sigma_n^2 Tr(v_{pq}v_{pq}^H)}{\lambda_t}\right)\right)$$

Design Methodology

According to aspects of the present disclosure, the total outage probability for the whole batch of time-frequency symbols is minimized to design equalizer weights for the FBMC-OQAM system 100.

The expression for the total outage probability derived in equation (23) is a non-convex function of the beamforming weights. Thus, direct minimization of the total outage probability is difficult. Aspects of the present disclosure propose an alternate way to minimize the total outage probability. The outage probability is a function of SINR as shown in equation (20). Thus, the problem of minimizing the total outage probability can be overcome by maximization of SINR. Aspects of the present disclosure propose a technique to maximize the statistical SINR for all the time-frequency symbols of the FBMC-OQAM system 100 in batch processing. To maximize the statistical SINR, expression for the statistical SINR for the time-frequency symbols in the FBMC-OQAM system 100 is derived.

The statistical SINR for the $pq^{th}$ symbol (denoted as $\gamma_{pq}$) is found by taking expectation on equation (12) and is given by:

$$\gamma_{pq} \triangleq \frac{E|v_{pq}^H H g_{pq}|^2}{E|v_{pq}^H H g_\alpha|^2 + E|v_{pq}^H H g_\beta|^2 + \sigma_n^2 Tr(v_{pq}v_{pq}^H)} \quad (24)$$

Further, using the linear algebra property: $Hg_{pq} = (I_N \otimes g_{pq}^T)h$, where $h \triangleq \text{vec}(H)$ is the vectorized version of matrix H, the statistical SINR defined in equation (24) can be expressed as:

$$\gamma_{pq} = \frac{v_{pq}^H\{(I_N \otimes g_{pq}^T)R_h(I_N \otimes g_{pq}^T)^H\}v_{pq}}{v_{pq}^H\{(I_N \otimes g_\alpha^T)R_h(I_N \otimes g_\alpha^T)^H + (I_N \otimes g_\beta^T)R_h(I_N \otimes g_\beta^T)^H + \sigma_n^2 I_N\}v_{pq}} \quad (24')$$

where $R_h \triangleq E(hh^H)$ is the correlation matrix of channel vector h and $I_N$ is the N-dimensional Identity matrix. Further, by defining the following matrices:

$$\begin{aligned} A &\triangleq (I_N \otimes g_{pq}^T)R_h(I_N \otimes g_{pq}^T)^H \\ B &\triangleq (I_N \otimes g_\alpha^T)R_h(I_N \otimes g_\alpha^T)^H + (I_N \otimes g_\beta^T)R_h(I_N \otimes g_\beta^T)^H + \sigma_n^2 I_N \end{aligned} \quad (25)$$

the statistical SINR can be rewritten as:

$$\gamma_{pq} = \frac{v_{pq}^H A v_{pq}}{v_{pq}^H B v_{pq}} \quad (26)$$

Next, eigenvalue decomposition of the matrix B is applied via $B = U\Lambda U^H$, where U is the matrix having eigenvectors and $\Lambda$ is the diagonal matrix containing the eigenvalues of the matrix B. By applying the following variable transformation:

$$u_{pq} = \Lambda^{1/2} U^H v_{pq} \quad (27)$$

the statistical SINR expressed by equation (26) can be reformulated as:

$$\gamma_{pq} = \frac{u_{pq}^H C u_{pq}}{u_{pq}^H u_{pq}} \quad (28)$$

where $C = \Lambda^{-1/2} U^H A U \Lambda^{-1/2}$.

According to aspects of the present disclosure, the optimum equalizer weight matrix W or equivalently the matrix V whose $pq^{th}$ column vector is $v_{pq}$ are designed. The optimization task is to design the transformed vector $u_{pq}$ that maximizes the statistical SINR $\gamma_{pq}$. Thus, the following optimization task is defined for the equalizer design in the FBMC-OQAM system 100:

$$\max_{u_{pq}} J_{pq} = \gamma_{pq} \\ \text{subject to } \|u_{pq}\| = 1 \quad (29)$$

The optimum value of $u_{pq}$ is the maximum eigenvector of the matrix C. If $C = U_C \Lambda_C U_C^H$ is the eigenvalue decomposition of matrix C, the optimum solution of equation (29) is given by:

$$u_{pq,opt} = \frac{u_{c,max}}{\|u_{c,max}\|} \quad (29')$$

Thus, the optimum solution for $v_{pq}$ is given by:

$$v_{pq,opt} = \frac{U\Lambda^{-1/2} u_{c,max}}{\|U\Lambda^{-1/2} u_{c,max}\|} \quad (30)$$

The above method is repeated for all the time-frequency (pq) symbols. The whole process is repeated for certain number of iterations till the change in objective function J is almost zero (or to a very small value, $\epsilon$). The optimum weights of the equalizer design for the FBMC-OQAM system 100 are found through the optimum value of the combined receiver matrix V.

According to aspects of the present disclosure, the equalizer design performs the blind method of equalization for the FBMC-OQAM system 100. The equalizer weights are designed by minimizing the total outage probability which is a function of the SINR. Accordingly, the method of blind equalization implemented by the FBMC-OQAM system 100 is based on maximizing the statistical SINR using the maximum eigenvector technique.

According to aspects of the present disclosure, steps for performing the method of blind equalization implemented by the FBMC-OQAM system 100 includes:

(i) Initializing the equalizer weight matrix W with random values.

(ii) Calculating the combined receiver matrix V using the relation in equation (10).

(iii) Calculating the matrices A and B using the expressions in equation (25) for frequency bin p=1 and time-slot q=1.

(iv) Performing the eigenvalue decomposition of the matrix B via $B=U\Lambda U^H$ and then computing the matrix C using the relation $C=\Lambda^{-1/2}U^H A U \Lambda^{-1/2}$.
(v) Performing the eigenvalue decomposition for the matrix C using $C=U_c \Lambda_c U_c^H$.
(vi) Computing the maximum eigenvector for the matrix C denoted by $u_{c,ax}$.
(vii) Applying the relation in equation (30) to obtain the solution for $v_{pq,pt}$.
(viii) Repeating the steps (iii)-(vii) for all the time-frequency symbols, i.e., frequency bins, p=1, 2 . . . , L and time-slots, q=1, 2, . . . K.
(ix) Repeating the complete process for few iterations till the total objective function J given by $$J(i) = \sum_{p=1}^{L}\sum_{q=1}^{K} J_{pq} \quad (31)$$

is almost constant or below a threshold (or acceptable) error margin, c, i.e., $$|J(i+1)-J(i)|\leq \varepsilon \quad (32)$$

and storing the optimum solution for the combined receiver matrix V.
(x) Obtaining the equalizer weight matrix W from the solution of the matrix V using equation (10).
(xi) After the optimum solution for the equalizer weight matrix W is obtained, computing the total outage probability $P_{out,OTAL}$ using the expression in equation (23).

Preliminary Results

Actual implementation of the FBMC-OQAM system 100 follows the steps represented by blocks shown in FIG. 1. For simulation purpose, the matrix model provided in equations (4)-(8) is utilized. In the simulation setup, 24 sub-carriers (i.e., L=24), 30 time symbols (i.e., K=30) and 500 Monte Carlo simulation runs are used. The sub-carrier spacing is set to 15 kHz. For OQAM implementation, order of pulse amplitude modulation (PAM) is set to 16 which is equivalent to 256 QAM. The Hermite prototype filter is used for waveform shaping at both the transmitter side and the receiver side. The SNR range used is [1, 45] dB.

The zero mean complex circular Gaussian channel vector h is generated using Jakes model for 2.5 GHz carrier frequency and 500 km/h vehicular speed which corresponds to a maximum Doppler shift of 1.16 kHz. In addition, the channel elements are generated with an exponential model for correlation matrix $R_h$ in which the elements of the correlation matrix are considered a function of correlation coefficient $\rho_{c;k}$ such that the $(i, j)^{th}$ entry of the correlation matrix is given by:

$$R_{h(i,j)}=\rho_h^{|i-j|} \text{ with } 0<\rho_h<1$$

where the parameter $\rho_h$ shows the correlation dependence. For example, $\rho_h=0$ shows no correlation (or uncorrelated scenario) and $\rho_h$ close to 1 shows that the channel is highly correlated. In the simulation experiments, the value of $\rho_h$ is set to 0.5. The channel matrix H is then constructed from the channel vector h using the relation $h \triangleq ve(H)$.

Figure 2:
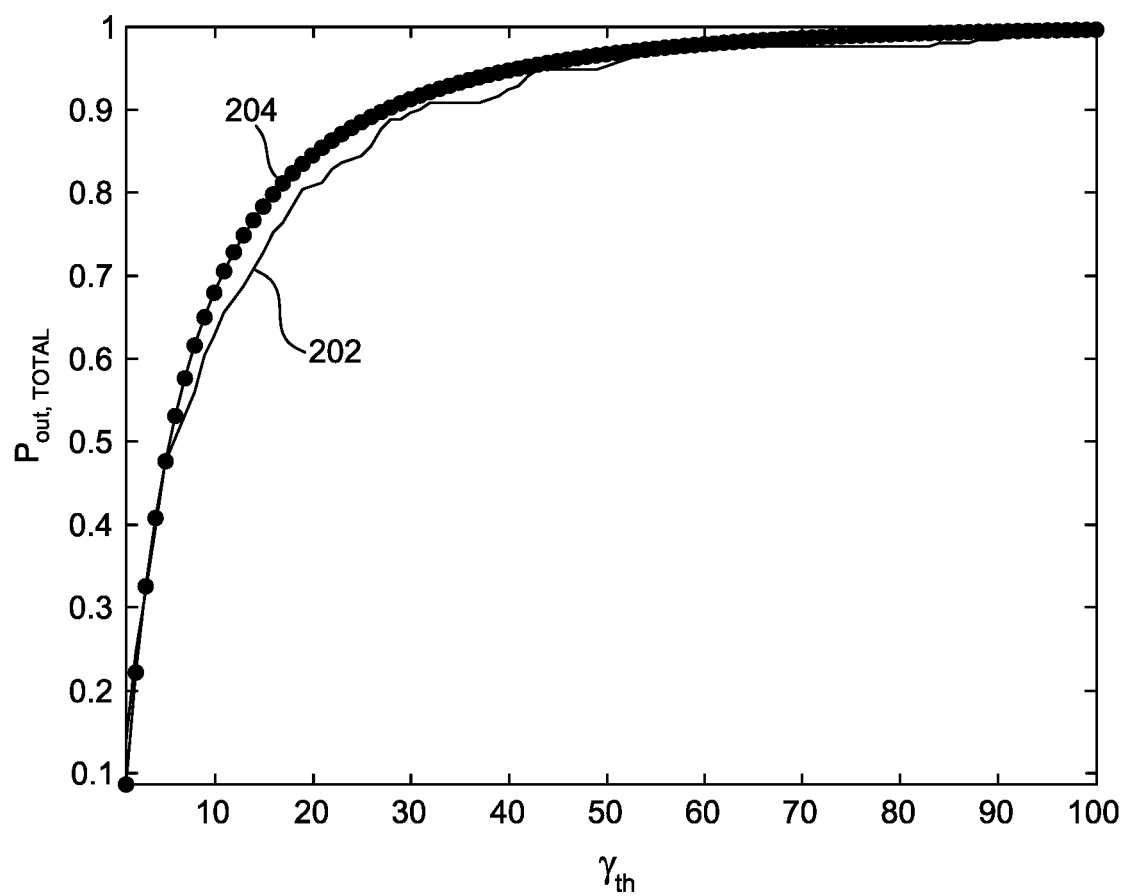
FIG. 2 is a graph showing validation of theoretical analysis for total outage probability, according to certain embodiments.

FIG. 2 shows validation of theoretical analysis for the total outage probability, $P_{out,OTAL}$ with L=24 and K=30, according to exemplary aspects of the present disclosure.

In a first experiment, the total outage probability, $P_{out,TOTAL}$ of all the time-frequency symbols for L=24 and K=30 obtained via the Monte Carlo simulation is compared with the total outage probability, $P_{out,TOTAL}$ computed using the analytical expression derived in equation (23). The results of the comparison are shown via the graph in FIG. 2. A curve 202 represents the total outage probability, $P_{out,TOTAL}$ obtained via the Monte Carlo simulation and a curve 204 represents the total outage probability, $P_{out,TOTAL}$ computed using the analytical expression derived in equation (23). The curves 202 and 204 show that the results obtained from the simulation are in good agreement with the results computed using the analytical expression of equation (23). Thus, the first experiment validates the theoretical findings for the total outage probability, $P_{out,OTAL}$.

Figure 3:
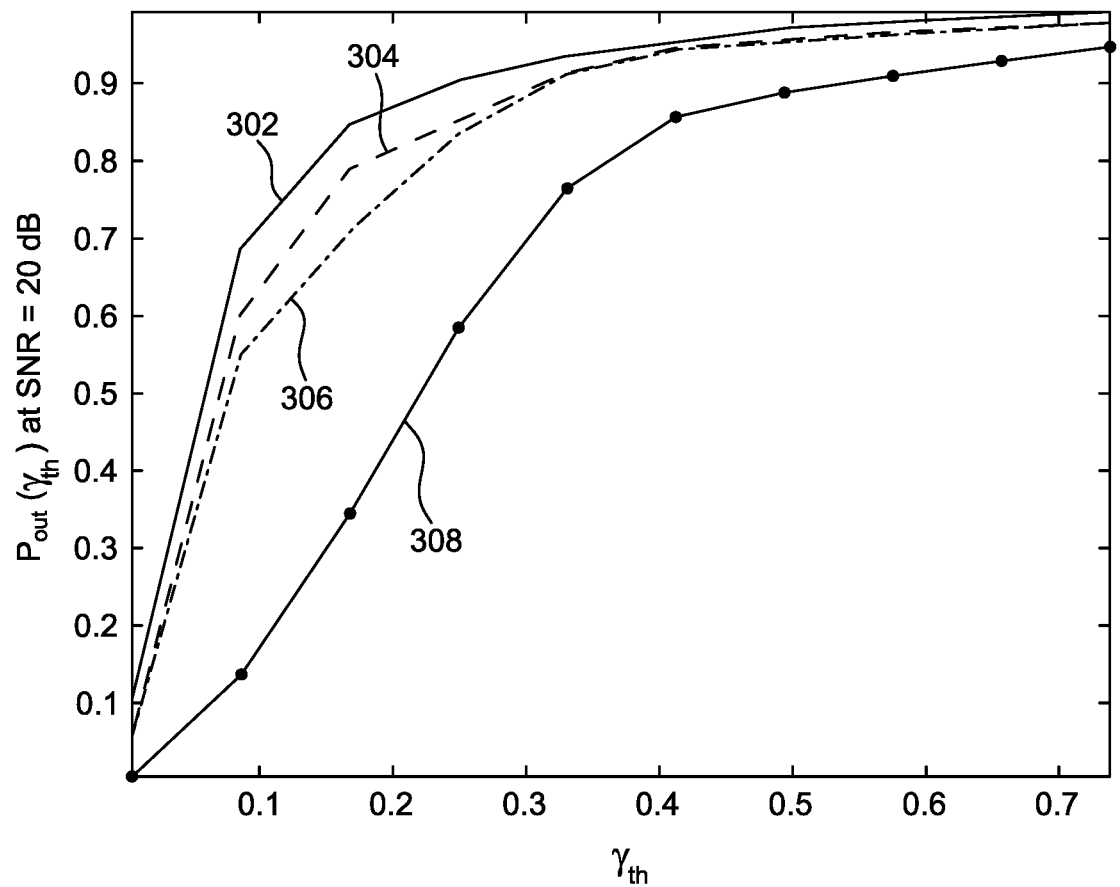
FIG. 3 is a graph showing comparison of total outage probability of FBMC system for different equalizers, according to certain embodiments.

FIG. 3 shows comparison of the total outage probability, $P_{out,OTAL}$ of the FBMC-OQAM system 100 for different equalizers, according to exemplary aspects of the present disclosure.

In a second experiment, the total outage probability, $P_{out,OTAL}$ of the FBMC-OQAM system 100 for different equalizers at SNR equal to 20 dB is compared. For comparison, the CMA equalizer and the one-tap equalizer is chosen in addition to blind equalizer of the present disclosure that performs the method of blind equalization according to aspects of the present disclosure. The CMA equalizer is implemented for every sub-carrier using corresponding time sequence. The one-tap equalizer is implemented using the estimation method given in equation (9). The blind equalizer is implemented using the steps (i-xi) for performing the method of blind equalization implemented by the FBMC-OQAM system 100. Initialization of the equalizer weight matrix W is chosen randomly. The total outage probability, $P_{out,OTAL}$ for all the compared equalizers is computed using the relation in equation (23). The results of the comparison are shown via the graph in FIG. 3. A curve 302 represents the total outage probability, $P_{out,TOTAL}$ without using any equalizer, a curve 304 represents the total outage probability, $P_{out,TOTAL}$ obtained using the CMA equalizer, a curve 306 represents the total outage probability, $P_{out,TOTAL}$ obtained using the one-tap equalizer, and a curve 308 represents the total outage probability, $P_{out,TOTAL}$ obtained using the blind equalizer of the present disclosure. From the curves 302, 304, 306, and 308 of FIG. 3, it can be seen that the blind equalizer of the present disclosure outperforms the other conventional equalizers (the CMA and one-tap equalizers) with significant margin. The spectral efficiency is also increased due to saving of bandwidth without pilot transmission.

Figure 4:
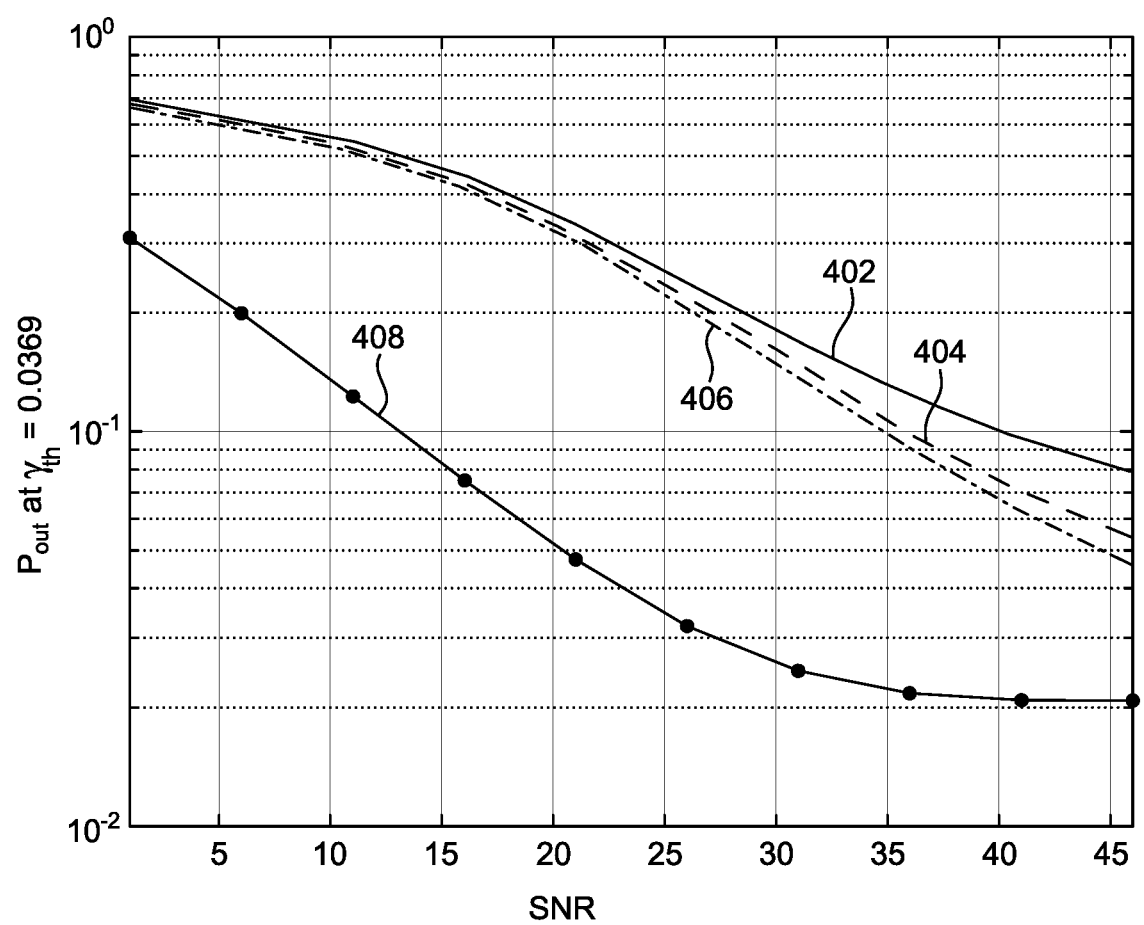
FIG. 4 is a graph showing comparison of relationship between total outage probability and SNR of FBMC-OQAM system for different equalizers, according to certain embodiments.

FIG. 4 shows comparison of relationship between the total outage probability, $P_{out,OTAL}$ and SNR of the FBMC-OQAM system 100 for different equalizers, according to exemplary aspects of the present disclosure.

In a third experiment, the equalization methods of all the equalizers compared in the second experiment are investigated for a fixed threshold value of $\gamma^{th}=0.0369$ and by varying the SNR in the range [1, 45] dB. The results of the comparison are shown via the graph in FIG. 4. A curve 402 represents the relationship between the total outage probability, $P_{out,TOTAL}$ and SNR without any equalizer, a curve 404 represents the relationship between the total outage probability, $P_{out,TOTAL}$ and SNR for the CMA equalizer, a curve 406 represents the relationship between the total outage probability, $P_{out,TOTAL}$ and SNR for the one-tap equalizer, and a curve 408 represents the relationship between the total outage probability, $P_{out,TOTAL}$ and SNR for the blind equalizer of the present disclosure. The curves 402, 404, 406, and 408 show that the total outage probability, $P_{out,TOTAL}$ for the equalization method of all the equalizers decreases with an increase in SNR value, which is logical as higher SNR corresponds to larger desired signal power which results in decreased outage probability. However, it can be observed from the results of the third experiment plotted in FIG. 4 that the performance of the blind equalizer of the present disclosure is significantly better than the other conventional equalizers (the CMA and one-tap equalizers) for the whole range of SNR, which further validates the performance of the blind equalizer of the present disclosure.

According to aspects of the present disclosure, the method of blind equalization implemented by the FBMC-OQAM system 100 is bandwidth efficient as it does not require to send pilot signals for the estimation of instantaneous channel state information (CSI). Instead, the method of blind equalization of the present disclosure relies only on statistical CSI, which can be estimated using received samples based computation.

According to aspects of the present disclosure, the method of blind equalization implemented by the FBMC-OQAM system 100 provides unbiased quality of service (QoS) to all users by imposing appropriate constraints in the optimization task.

According to aspects of the present disclosure, the outage probability is characterized in closed form by employing the approach of characterizing indefinite quadratic forms without imposing approximations.

According to aspects of the present disclosure, the method of blind equalization implemented by the FBMC-OQAM system 100 improves outage performance by maximizing the statistical SINR for each time-frequency symbol.

According to aspects of the present disclosure, the method of blind equalization implemented by the FBMC-OQAM system 100 improves the coverage of a network. Indirect minimization of the total outage probability without sending pilot signals results in better spectral efficiency, which in turn allows accommodating more users.

The method of blind equalization of the present disclosure is based on maximizing the statistical SINR using the maximum eigenvector technique. In contrast to other supervised learning methods of equalization, the proposed method of blind equalization does not require pilot symbols transmission and hence reduces the overhead of transmission. This eventually increases the spectral efficiency, which allows to accommodate more users in the system, thus increasing the network coverage of the system. Moreover, unlike the conventional equalization methods such as Constant Modulus Algorithm (CMA), the proposed method of blind equalization utilizes the channel statistics, i.e., the channel's correlation matrix knowledge. Thus, the proposed method of blind equalization provides better performance than the conventional equalization method.

Figure 5:
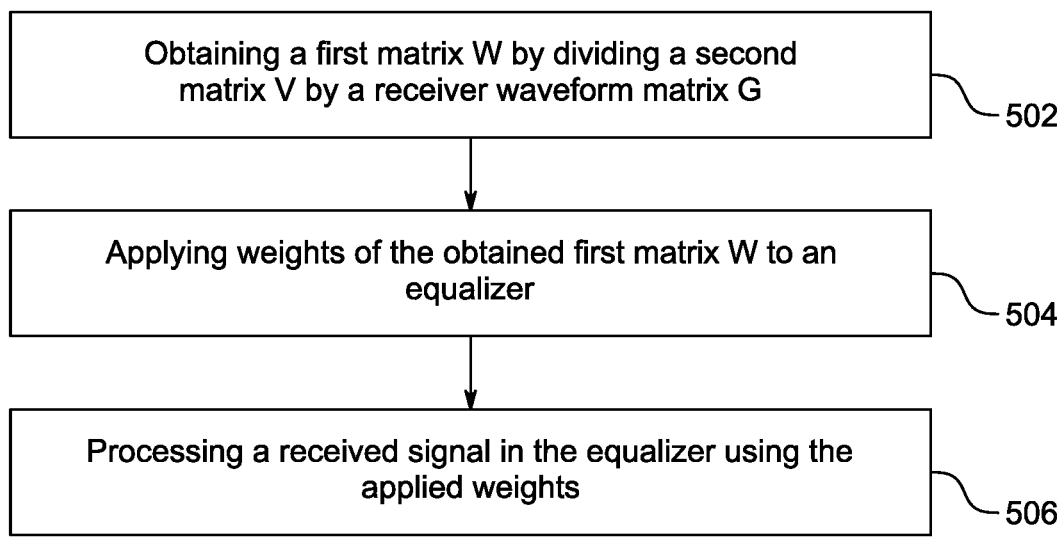
FIG. 5 is an exemplary flowchart of a method of blind equalization implemented by FBMC-OQAM transmission system, according to certain embodiments.

FIG. 5 shows an exemplary flowchart 500 of a method of blind equalization implemented by the FBMC-OQAM system 100, according to exemplary aspects of the present disclosure.

At step 502, the method includes obtaining the equalizer weight matrix W by dividing the combined receiver matrix V by the receiver waveform matrix G The combined receiver matrix V is obtained by calculating the total objective function J until the total objective function J is either constant or below the threshold error margin, $\epsilon$. The calculation of the total objective function J includes iterating calculations with a plurality of combinations of the frequency bin p and the time-slot q.

At step 504, the method includes applying weights of the equalizer weight matrix W to the blind equalizer to perform the method of blind equalization.

At step 506, the method includes processing the received signal in the blind equalizer using the applied weights. The weights of the equalizer weight matrix W are configured to minimize the total outage probability $P_{out,TOTAL}$.

Figure 6:
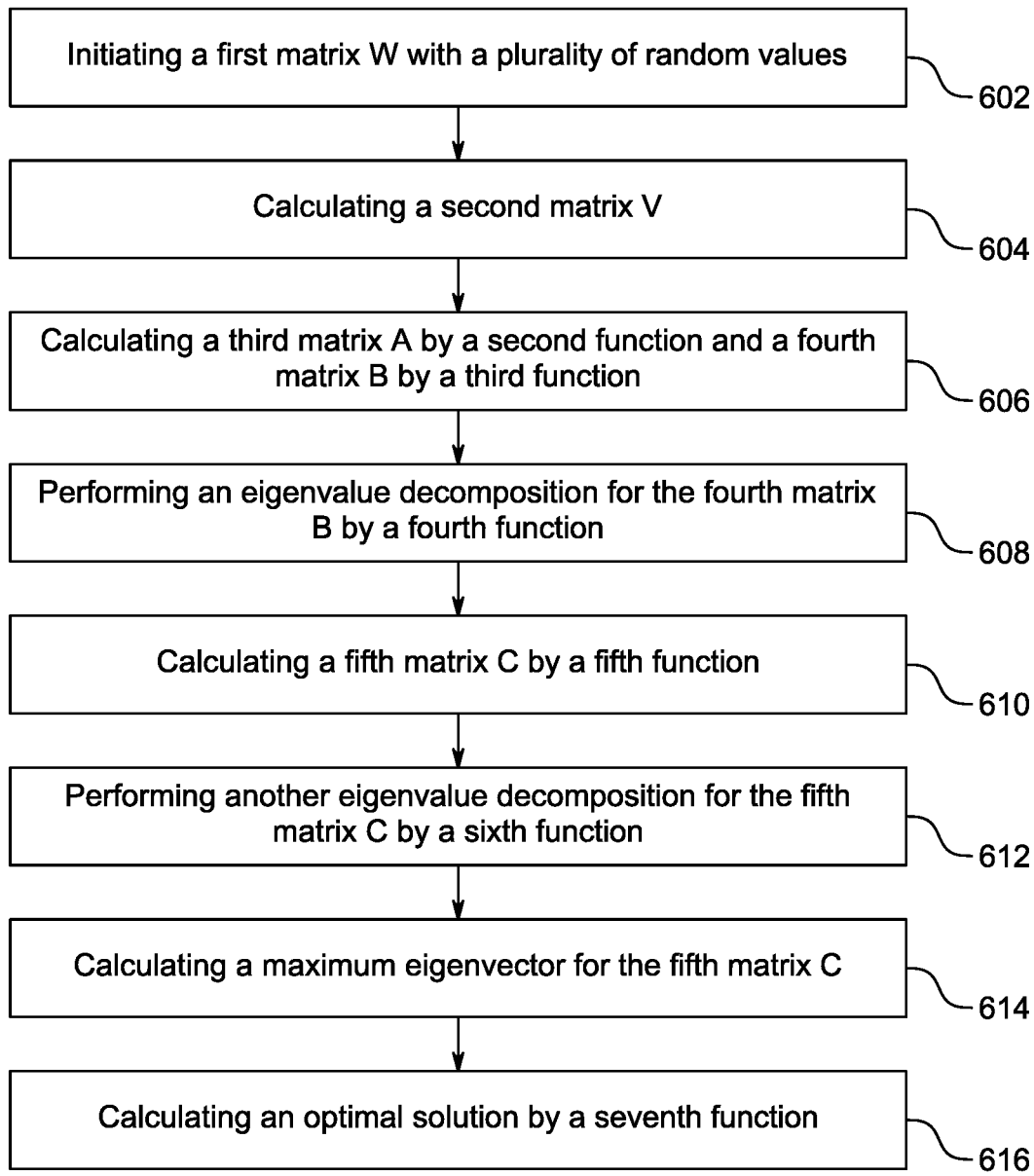
FIG. 6 is another exemplary flowchart of a method of blind equalization implemented by FBMC-OQAM transmission system, according to certain embodiments.

FIG. 6 shows another exemplary flowchart 600 of a method of blind equalization implemented by the FBMC-OQAM system 100, according to exemplary aspects of the present disclosure.

At step 602, the method includes initiating the equalizer weight matrix W with a plurality of random values.

At step 604, the method includes calculating the combined receiver matrix V. The combined receiver matrix V is the equalizer weight matrix W multiplying by the receiver waveform matrix G.

At step 606, the method includes calculating the matrix A and the matrix B by using the expressions in equation (25). The calculation including the frequency bin p and the time slot q.

At step 608, the method includes performing eigenvalue decomposition for the matrix B using the relation $B=U\Lambda U^H$.

At step 610, the method includes calculating the matrix C using the relation $C=\Lambda^{-1/2}U^H A U \Lambda^{-1/2}$.

At step 612, the method includes performing eigenvalue decomposition for the matrix C using $C=U_c \Lambda_c U_c^H$.

At step 614, the method includes calculating the maximum eigenvector $u_{c,ax}$ for the matrix C.

At step 616, the method includes calculating an optimal solution for $v_{pq,pt}$ using the relation in equation (30).

The steps 602-616 are repeated for all the time-frequency symbols, i.e., frequency bins, p=1, 2, . . . , L and time-slots, q=1, 2, . . . K.

The first embodiment is illustrated with respect to FIGS. 1-10. The first embodiment describes the filter bank multi-carrier with offset quadrature amplitude modulation (FBMC-OQAM) system 100 that performs the blind equalization. The FBMC-OQAM system 100 comprises processing circuitry configured to obtain a first matrix W by dividing a second matrix V by a receiver waveform matrix G, wherein the second matrix V is obtained by calculating a total objective function J until the total objective function J reaches a threshold value, the calculation of the total objective function J including iterating calculations with a plurality of combination of a frequency bin p and a time slot q; apply weights of the obtained first matrix W to an equalizer; and process a received signal in the equalizer using the applied weights, wherein the weights of the obtained first matrix Ware configured to minimize a total outage probability $P_{out,TOTAL}$.

The processing circuitry of the FBMC-OQAM system 100 calculates the total objective function by performing a process that includes: (i) initiating the first matrix W with a plurality of random values; (ii) calculating the second matrix V, the second matrix V being the first matrix W multiplying by the receiver waveform matrix G; (iii) calculating a third matrix A by a second function and a fourth matrix B by a third function, the calculation including the frequency bin p and the time slot q; (iv) performing an eigenvalue decomposition for the fourth matrix B by a fourth function; (v) calculating a fifth matrix C by a fifth function; (vi) performing another eigenvalue decomposition for the fifth matrix C by a sixth function; (vii) calculating a maximum eigenvector $u_{c,max}$ for the fifth matrix C; and (viii) calculating an optimal solution $v_{pq,opt}$ by a seventh function.

The process includes step ix, in which steps (iii)-(viii) are repeated for all p and q.

The total outage probability $P_{out, TOTAL}$ is calculated using a first function $$J = \sum_{p=1}^{L}\sum_{q=1}^{K} J_{pq},$$

the p including integers from 1 to L, and the Q including integers from 1 to K.

Steps i-ix are repeated until the total objective function J is either constant or below a threshold error margin.

The threshold error margin is $|J(i+1)-J(i)| \leq \varepsilon$.

The second embodiment is illustrated with respect to FIGS. 1-10. The second embodiment describes a method of blind equalization implemented by the filter bank multi-carrier with offset quadrature amplitude modulation (FBMC-OQAM) system 100. The method comprising: obtaining a first matrix W by dividing a second matrix V by a receiver waveform matrix G, wherein the second matrix V is obtained by calculating a total objective function J until the total objective function J reaches a threshold value, the calculation of the total objective function J including iterating calculations with a plurality of combination of a frequency bin p and a time slot q; applying weights of the obtained first matrix W to an equalizer; and processing a received signal in the equalizer using the applied weights, wherein the weights of the obtained first matrix W are configured to minimize a total outage probability $P_{out,TOTAL}$.

Calculating the total objective function includes a process comprising: (i) initiating the first matrix W with a plurality of random values; (ii) calculating the second matrix V, the second matrix V being the first matrix W multiplying by the receiver waveform matrix G; (iii) calculating a third matrix A by a second function and a fourth matrix B by a third function, the calculation including the frequency bin p and the time slot q; (iv) performing an eigenvalue decomposition for the fourth matrix B by a fourth function; (v) calculating a fifth matrix C by a fifth function; (vi) performing another eigenvalue decomposition for the fifth matrix C by a sixth function; (vii) calculating a maximum eigenvector $u_{c,max}$ for the fifth matrix C; and (viii) calculating an optimal solution $v_{pq,opt}$ by a seventh function.

The process includes step ix, in which steps (iii)-(viii) are repeated for all p and q. The total outage probability $P_{out,TOTAL}$ is calculated using a first function $$J = \sum_{p=1}^{L}\sum_{q=1}^{K} J_{pq},$$

the p including integers from 1 to L, and the Q including integers from 1 to K.

Steps i-ix are repeated until the total objective function J is either constant or below a threshold error margin.

The threshold error margin is $|J(i+1)-J(i)| \leq \varepsilon$.

The total outage probability $P_{out,TOTAL}$ is for a time-frequency batch of LK symbols.

The second function is $A \triangleq (I_N \otimes g_{pq}^T) R_h (I_N \otimes g_{pq}^T)^H$, wherein $I_N$ is a N-dimensional identity matrix, $R_h$ is a correlational matrix, H is a matrix, and $g_{pq}^T$ is a pulse vector.

The third function is $\triangleq (I_N \otimes g_\alpha^T) R_h (I_N \otimes g_\alpha^T)^H + (I_N \otimes g_\beta^T) R_h (I_N \otimes g_\beta^T)^H + \sigma_n^2 I_N$, wherein $I_N$ is a N-dimensional identity matrix, $R_h$ is a correlational matrix, $g_\alpha^T$, and $g_\beta^T$ are pulse vectors, and H is a matrix.

The fourth function is $B = U\Lambda U^H$, wherein U is a matrix having eigenvectors and $\Lambda$ is a diagonal matrix containing eigenvalues of the fourth matrix B.

The fifth function is $C = \Lambda^{-1/2} A U \Lambda^{-1/2}$.
The sixth function is $C = U_C \Lambda_C U_C^H$.
The seventh function is $$v_{pq,opt} = \frac{U\Lambda^{-1/2} u_{c,max}}{\left\| U\Lambda^{-1/2} u_{c,max} \right\|}.$$

The third embodiment is illustrated with respect to FIGS. 1-10. The third embodiment describes a non-transitory computer readable medium having instructions stored therein that, when executed by a computer, cause the computer to perform a method of: obtaining a first matrix W by dividing a second matrix V by a receiver waveform matrix G, wherein the second matrix V is obtained by calculating a total objective function J until the total objective function J reaches a threshold value, the calculation of the total objective function J including iterating calculations with a plurality of combination of a frequency bin p and a time slot q; applying weights of the obtained first matrix W to an equalizer; and processing a received signal in the equalizer using the applied weights, wherein the weights of the obtained first matrix W are configured to minimize a total outage probability $P_{out,TOTAL}$.

Figure 7:
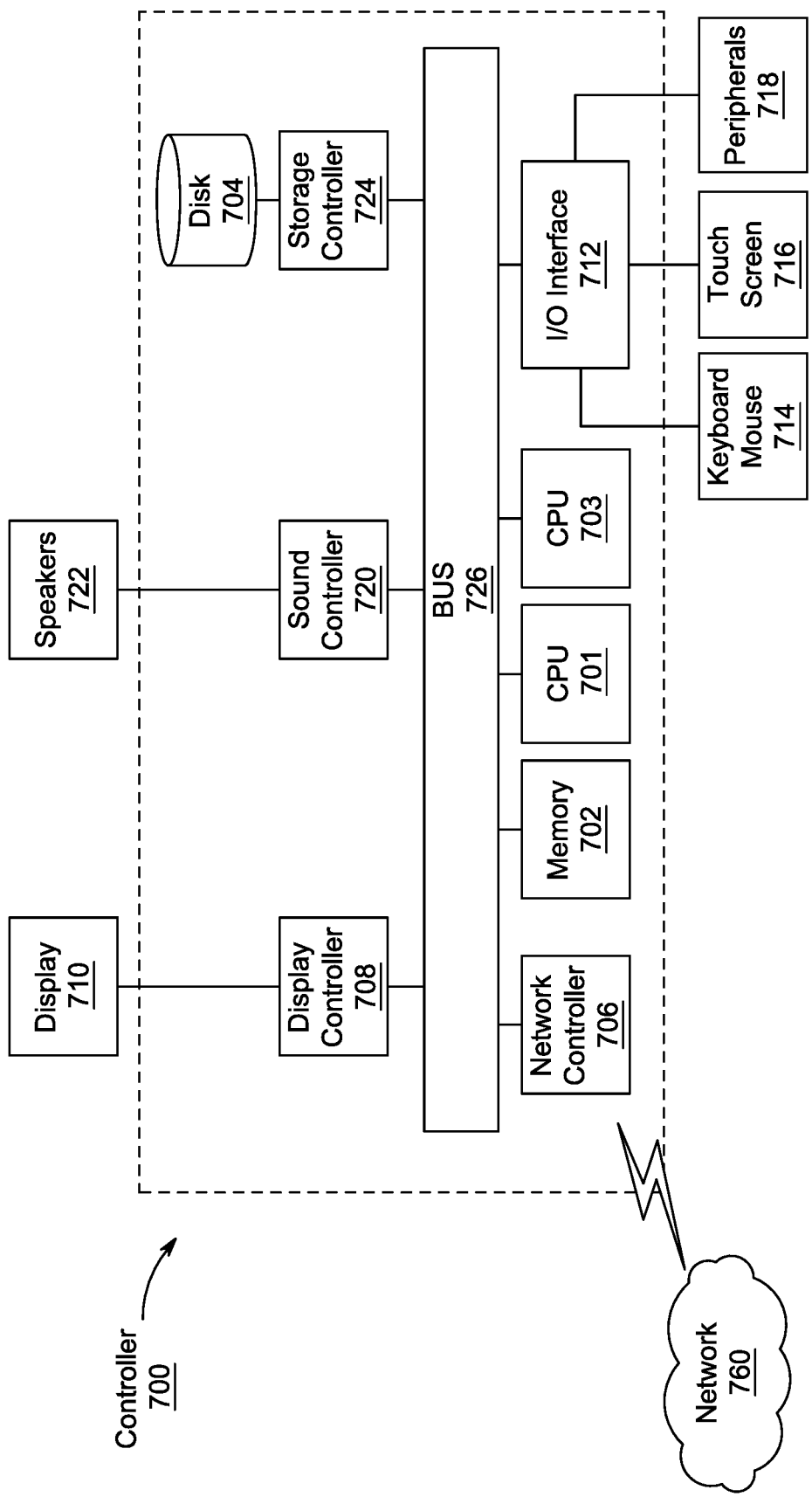
FIG. 7 is an illustration of a non-limiting example of details of computing hardware used in the computing system, according to certain embodiments.

FIG. 7 is an illustration of a non-limiting example of details of computing hardware used in the computing system associated with the FBMC-OQAM system 100, according to exemplary aspects of the present disclosure. In FIG. 7, a controller 700 is described in which the controller is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN subnetworks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
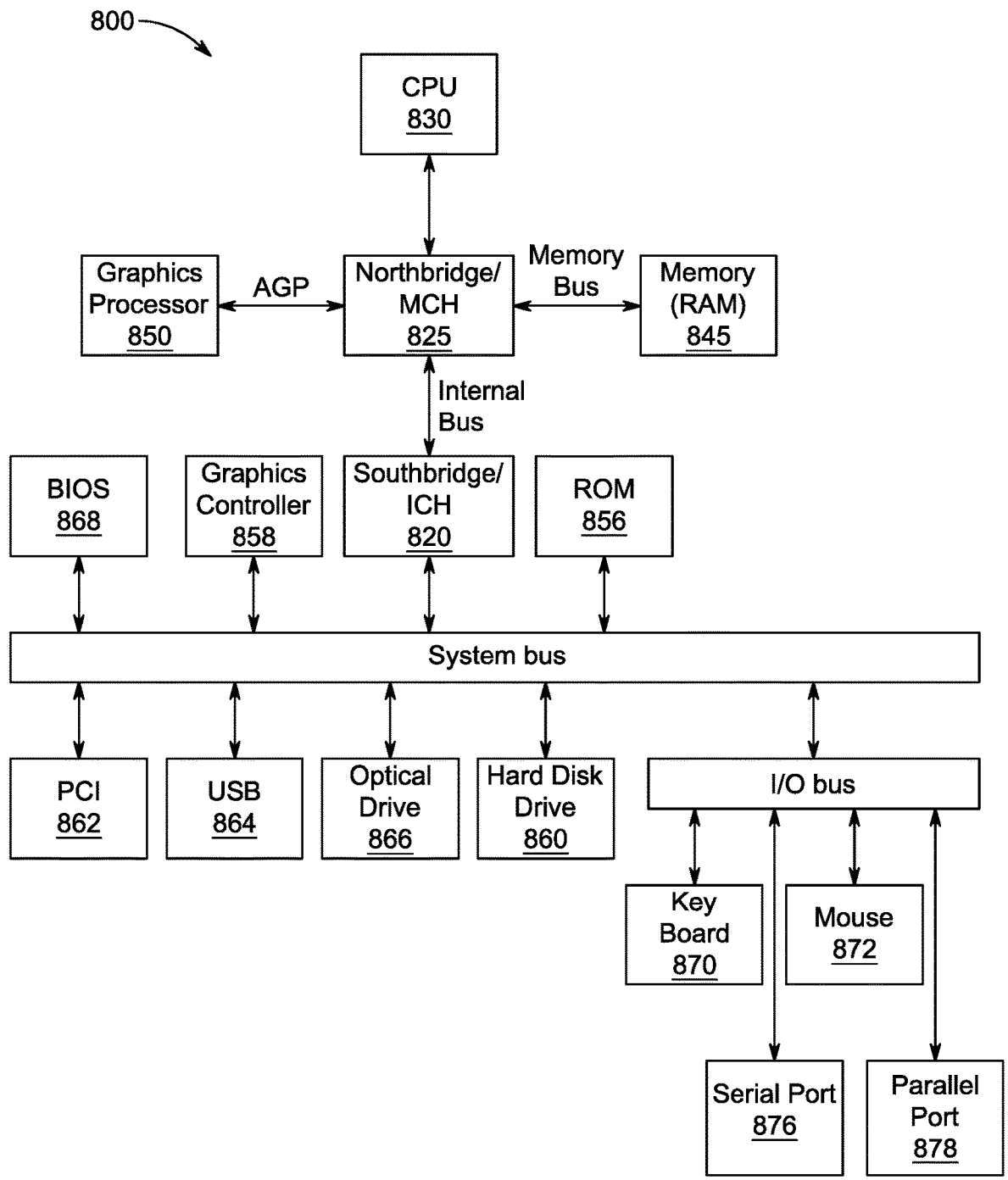
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
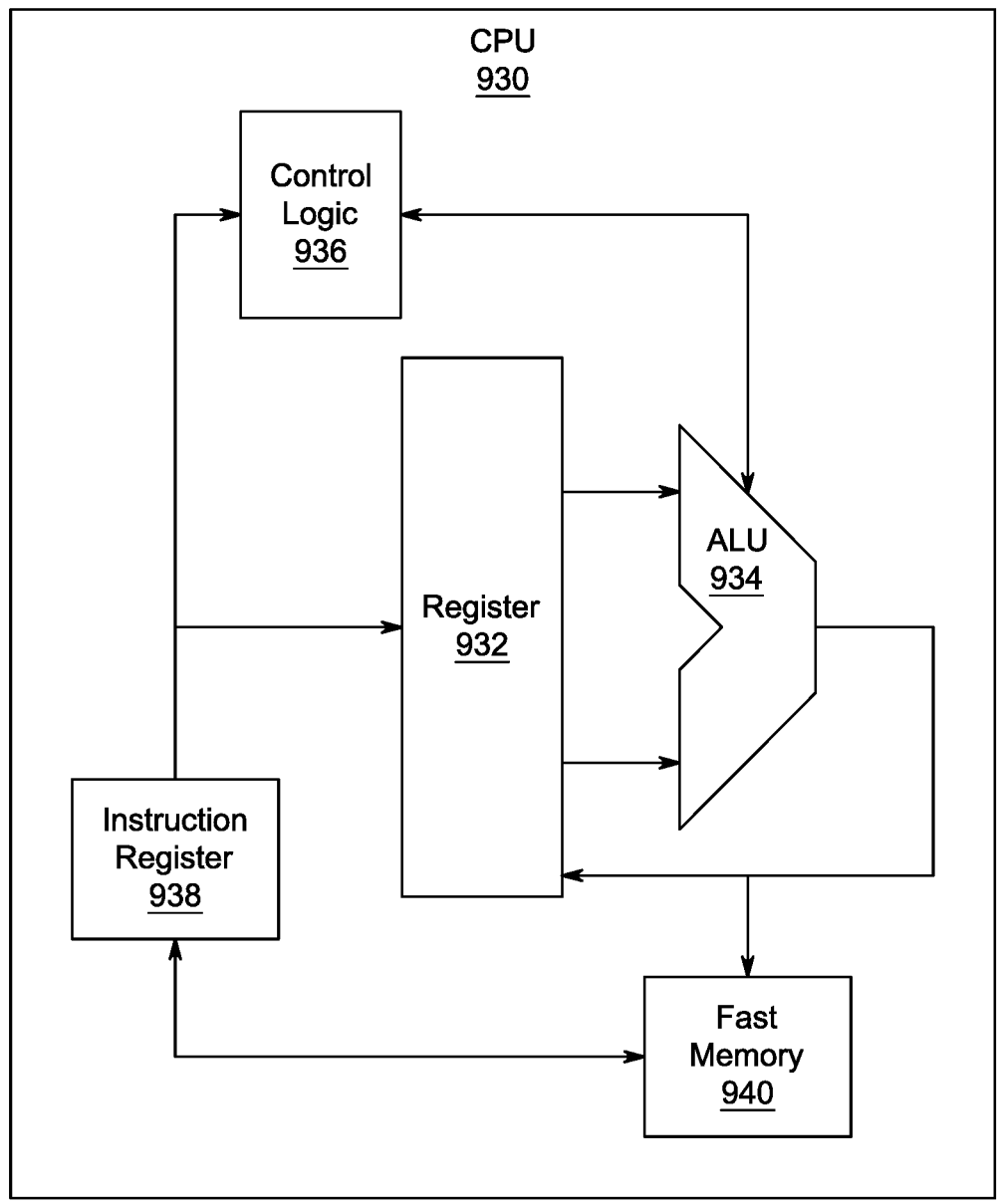
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA , an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
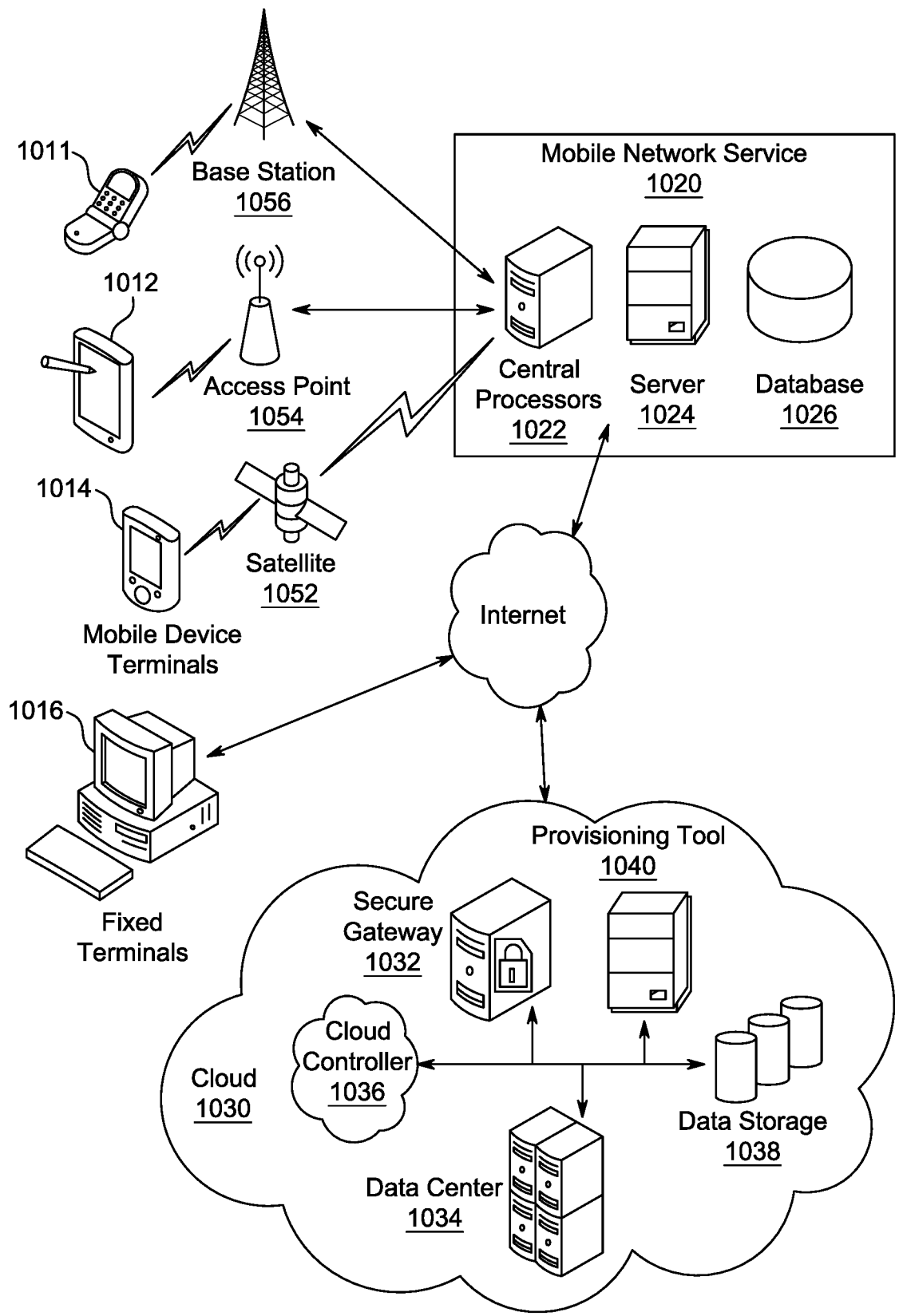
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of blind equalization implemented by processing circuitry of a filter bank multi-carrier with offset quadrature amplitude modulation (FBMC-OQAM) transmission system that includes a transmitter side and a receiver side disposed on opposite sides of a wireless communication channel, comprising:
   obtaining a first matrix W, which is a matrix of weights to be applied to an equalizer provided in the receiver side of the FBMC-OQAM transmission system, by dividing a second matrix V by a receiver waveform matrix G, wherein the second matrix V is obtained by calculating a total objective function J until the total objective function J is either constant or below a threshold error margin, the calculation of the total objective function J including iterating calculations with a plurality of combinations of a frequency bin p and a time slot q;
   applying the weights of the obtained first matrix W to the equalizer; and
   processing a received signal in the equalizer using the applied weights, the received signal being a signal that is received at the receiver side of the FBMC-OQAM transmission system based on a signal that is transmitted over the wireless communication channel from the transmitter side,
   wherein the weights of the obtained first matrix W are configured to minimize a total outage probability $P_{out,TOTAL}$ with regard to received signals received after the weights are applied to the equalizer, which the total outage probability $P_{out,TOTAL}$ is a probabality that data will not be received over the wireless communication channel for a time-frequency batch of symbols.

2. The method of claim 1, wherein calculating the total objective function includes a process comprising:
   (i) initiating the first matrix W with a plurality of random values;
   (ii) calculating the second matrix V, the second matrix V being the first matrix W multiplying by the receiver waveform matrix G;
   (iii) calculating a third matrix A by a second function and a fourth matrix B by a third function, the calculation including the frequency bin p and the time slot q;
   (iv) performing an eigenvalue decomposition for the fourth matrix B by a fourth function;
   (v) calculating a fifth matrix C by a fifth function;
   (vi) performing another eigenvalue decomposition for the fifth matrix C by a sixth function;
   (vii) calculating a maximum eigenvector $u_{c,max}$ for the fifth matrix C; and
   (viii) calculating an optimal solution $v_{pq,opt}$ by a seventh function.

3. The method of claim 2, wherein the process includes step ix, in which steps (iii)-(viii) are repeated for all p and q.

4. The method of claim 3, wherein the total outage probability $P_{out,TOTAL}$ is calculated using a first function $$J = \sum_{p=1}^{L}\sum_{q=1}^{K} J_{pq},$$

the p including integers from 1 to L, and the Q including integers from 1 to K.

5. The method of claim 4, wherein steps i-ix are repeated until the total objective function J is either constant or below a threshold error margin.

6. The method of claim 5, wherein the threshold error margin is $|J(i+1)-J(i)| \leq \varepsilon$.

7. The method of claim 2, wherein the second function is $A \triangleq (I_N \otimes g_{pq}^T) R_H (I_N \otimes g_{pq}^T)^H$, wherein $I_N$ is a N-dimensional identity matrix, $R_h$ is a correlational matrix, H is a matrix, and $g_{pq}^T$ is a pulse vector.

8. The method of claim 2, wherein the third function is $B \triangleq (I_N \otimes g_\alpha^T) R_h (I_N \otimes g_\alpha^T)^H + (I_N \otimes g_\beta^T) R_h (I_N \otimes g_{62}^T)^H$, wherein $I_N$ is a N-dimensional identity matrix, $R_h$ is a correlational matrix, $g_\alpha^T$ and $g_\beta^T$ are pulse vectors, H is a matrix.

9. The method of claim 2, wherein the fourth function is $B = U \Lambda U^H$, wherein U is a matrix having eigenvectors and $\Lambda$ is a diagonal matrix containing eigenvalues of the fourth matrix B.

10. The method of claim 2, wherein the fifth function is $C = \Lambda^{-1/2} U^H A U \Lambda^{-1/2}$.

11. The method of claim 2, wherein the sixth function is $C = U_c \Lambda_C U_C^H$.

12. The method of claim 2, wherein the seventh function is $$v_{pq,opt} = \frac{U\Lambda^{-1/2} u_{c,max}}{\left\| U\Lambda^{-1/2} u_{c,max} \right\|}.$$

13. A filter bank multi-carrier with offset quadrature amplitude modulation (FBMC-OQAM) transmission system that includes a transmitter side and a receiver side disposed on opposite sides of a wireless communication channel and that performs blind equalization, comprising:
   processing circuitry configured to
      obtain a first matrix W, which is a matrix of weights to be applied to an equalizer provided in the receiver side of the FBMC-OQAM transmission system, by dividing a second matrix V by a receiver waveform matrix G, wherein the second matrix V is obtained by calculating a total objective function J until the total objective function J is either constant or below a threshold error margin, the calculation of the total objective function J including iterating calculations with a plurality of combinations of a frequency bin p and a time slot q;
      apply the weights of the obtained first matrix W to the equalizer; and
      process a received signal in the equalizer using the applied weights, the received signal being a signal that is received at the receiver side of the FBMC-OQAM transmission system based on a signal that is transmitted over the wireless communication channel from the transmitter side,
   wherein the weights of the obtained first matrix W are configured to minimize a total outage probability $P_{out,TOTAL}$ with regard to received signals received after the weights are applied to the equalizer, which the total outage probability $P_{out,TOTAL}$ is a probabality that data will not be received over the wireless communication channel for a time-frequency batch of symbols.

14. The FBMC-OQAM transmission system of claim 13, wherein the processing circuitry calculates the total objective function by performing a process that includes:
(i) initiating the first matrix W with a plurality of random values;
(ii) calculating the second matrix V, the second matrix V being the first matrix W multiplying by the receiver waveform matrix G;
(iii) calculating a third matrix A by a second function and a fourth matrix B by a third function, the calculation including the frequency bin p and the time slot q;
(iv) performing an eigenvalue decomposition for the fourth matrix B by a fourth function;
(v) calculating a fifth matrix C by a fifth function;
(vi) performing another eigenvalue decomposition for the fifth matrix C by a sixth function;
(vii) calculating a maximum eigenvector $u_{c,max}$ for the fifth matrix C; and
(viii) calculating an optimal solution $v_{pq,opt}$ by a seventh function.

15. The FBMC-OQAM transmission system of claim 14, wherein the process includes step ix, in which steps (iii)-(viii) are repeated for all p and q.

16. The FBMC-OQAM transmission system of claim 15, wherein the total outage probability $P_{out,TOTAL}$ is calculated using a first function $$J = \sum_{p=1}^{L} \sum_{q=1}^{K} J_{pq},$$

the p including integers from 1 to L, and the Q including integers from 1 to K.

17. The FBMC-OQAM transmission system of claim 16, wherein steps i-ix are repeated until the total objective function J is either constant or below a threshold error margin.

18. The FBMC-OQAM transmission system of claim 17, wherein the threshold error margin is $|J(i+1)-J(i)|\leq\varepsilon$.

19. A non-transitory computer readable medium that stores a program that when executed by processing circuitry of a filter bank multi-carrier with offset quadrature amplitude modulation (FBMC-OQAM) transmission system, that includes a transmitter side and a receiver side disposed on opposite sides of a wireless communication channel and that performs blind equalization, causes the processing circuitry to perform a method including:
obtaining a first matrix W, which is a matrix of weights to be applied to an equalizer provided in the receiver side of the FBMC-OQAM transmission system, by dividing a second matrix V by a receiver waveform matrix G, wherein the second matrix V is obtained by calculating a total objective function J until the total objective function J is either constant or below a threshold error margin, the calculation of the total objective function J including iterating calculations with a plurality of combinations of a frequency bin p and a time slot q;
applying the weights of the obtained first matrix W to the equalizer; and
processing a received signal in the equalizer using the applied weights, the received signal being a signal that is received at the receiver side of the FBMC-OQAM transmission system based on a signal that is transmitted over the wireless communication channel from the transmitter side,
wherein the weights of the obtained first matrix W are configured to minimize a total outage probability $P_{out,TOTAL}$ with regard to received signals received after the weights are applied to the equalizer, which the total outage probability $P_{out,TOTAL}$ is a probabality that data will not be received over the wireless communication channel for a time-frequency batch of symbols.

\* \* \* \* \*